United States Patent
Rao Krishnagi et al.

(10) Patent No.: US 11,900,119 B2
(45) Date of Patent: Feb. 13, 2024

(54) SYSTEM AND METHOD FOR AUTOMATICALLY CONTROLLING OPERATING STATE OF AN APPLICATION

(71) Applicant: JPMorgan Chase Bank, N.A., New York, NY (US)

(72) Inventors: Kumar Rao Krishnagi, Powell, OH (US); Matthew J Porter, Mechanicsburg, OH (US); Laxman Dongisharapu, Hyderabad (IN); Vijay Kumar Perla, Westerville, OH (US); Nalini S Boda, Lewis Center, OH (US); Mark A Wells, Dublin, OH (US); Christopher Mathews, Wilmington, DE (US); Kenneth S Brooks, New Castle, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 254 days.

(21) Appl. No.: 17/229,388

(22) Filed: Apr. 13, 2021

(65) Prior Publication Data

US 2022/0276869 A1 Sep. 1, 2022

(30) Foreign Application Priority Data

Feb. 26, 2021 (IN) .............................. 202111008258

(51) Int. Cl.
*G06F 9/54* (2006.01)
*G06F 8/61* (2018.01)
(Continued)

(52) U.S. Cl.
CPC .............. *G06F 9/3836* (2013.01); *G06F 8/61* (2013.01); *G06F 9/3017* (2013.01); *G06F 9/485* (2013.01);
(Continued)

(58) Field of Classification Search
CPC .......................... G06F 9/485–541; G06F 8/61
See application file for complete search history.

(56) References Cited

U.S. PATENT DOCUMENTS

2019/0034313 A1* 1/2019 Vedurumudi ........... H04L 43/04
2020/0310881 A1* 10/2020 Gonzalez .............. G06F 9/5022

OTHER PUBLICATIONS

Time Based Scaling for Kubernetes Deployments Armanit Garg medium.com/symbl-ai-engineering-and-data-science/time-based-scaling-for-kubernetes-deployments-9ef7ada93eb7 (Year: 2020).*

(Continued)

*Primary Examiner* — Emerson C Puente
*Assistant Examiner* — Paul V Mills
(74) *Attorney, Agent, or Firm* — GREENBLUM & BERNSTEIN, P.L.C.

(57) ABSTRACT

Various methods, apparatuses/systems, and media for automatically controlling operating state of one or more applications in a distributed operating system are disclosed. A processor creates a filesystem that contains a script configured for interacting with a distributed operating system application programming interface (API); and integrates the filesystem with a scheduler module to be run on a predefined schedule. The processor also creates a container, in response to the predefined schedule, in the distributed operating system, the container having the script installed therein; calls the distributed operating system API to obtain a list of applications in the distributed operating system based on the script; automatically controls the operating state of the corresponding one or more applications in the distributed operating system in response to the predefined schedule and the script; and destroys the container after controlling the operating state of the corresponding one or more applications.

15 Claims, 7 Drawing Sheets

(51) Int. Cl.
    *G06F 9/48*           (2006.01)
    *G06F 9/50*           (2006.01)
    *G06F 9/38*           (2018.01)
    *G06F 9/30*           (2018.01)

(52) U.S. Cl.
    CPC .......... *G06F 9/5022* (2013.01); *G06F 9/5077* (2013.01); *G06F 9/541* (2013.01)

(56) References Cited

OTHER PUBLICATIONS

Reducing project infrastructure costs by time based scaling for Kubernetes Michael Wirth Jan. 1, 2021 blog.mimacom.com/time-based-scaling-for-kubernetes/ (Year: 2021).*

What is kubectl? Sangam Biradar web.archive.org/web/20191012042535/dockerlabs.collabnix.com/kubernetes/beginners/what-is-kubect.html (Year: 2019).*

Kubernetes Online Documentation v1.20 Selected portions; head page: web.archive.org/web/20210110095209/https://kubernetes.io/docs/home/ (Year: 2020).*

Kubernetes Online Documentation, section "The Kubernetes API" Retrieved from: web.archive.org/web/20210110121157/https://kubernetes.io/docs/concepts/overview/kubernetes-api/ (Year: 2020).*

Boosting your kubectl productivity Daniel Weibel learnk8s.io/blog/kubectl-productivity (Year: 2019).*

Beginning Kubernetes on the Google Cloud Platform—A Guide to Automating Application Deployment, Scaling, and Management Ernesto Garbarino ISBN-13 (electronic): 978-1-4842-5491-2; doi.org/10.1007/978-1-4842-5491-2 (Year: 2019).*

Running a command on all kubernetes pods of a service Yonah Dissen, Dusan Jovanovic et al. Stackoverflow question thread stackoverflow.com/questions/51026174/running-a-command-on-all-kubernetes-pods-of-a-service (Year: 2018).*

\* cited by examiner

```
kind: Role
apiVersion: rbac.authorization.k8s.io/v1
metadata:
  name: serviceRole
rules:
  - apiGroups: ["apps"]
    resources: ["deployments", "deployments/scale",
"statefulsets", "statefulsets/scale"]
    verbs: ["get", "list", "watch", "update", "patch"]
  - apiGroups: [""]
    resources: ["secrets", "pods"]
    verbs: ["get", "list", "create", "watch", "update", "patch", "delete"]
  - apiGroups: ["extensions"]
    resources: ["deployments", "deployments/scale"]
    verbs: ["get", "list", "watch", "update", "patch"]
---
kind: RoleBinding
apiVersion: rbac.authorization.k8s.io/v1
metadata:
  name: defaultroles
subjects:
  - kind: ServiceAccount
    name: default
roleRef:
  kind: Role
  apiGroup: rbac.authorization.k8s.io
  name: serviceRole
```

```
apiVersion: batch/v1beta1
kind: CronJob
metadata:
  name: stop
spec:
  schedule: "0 23 * * 1-5"
  successfulJobsHistoryLimit: 3
  failedJobsHistoryLimit: 3
  jobTemplate:
    metadata:
      labels:
        name: lightswitch
    spec:
      template:
        metadata:
          labels:
            name: lightswitch
        spec:
          imagePullSecrets:
            - name: image-pull-secret
          containers:
            - name: lightswitch
              image: lightswitch:v03
              args:
                - /bin/sh
                - -c
                - lightswitch -d default -a stop
          restartPolicy: OnFailure
```

FIG. 6

SYSTEM AND METHOD FOR AUTOMATICALLY CONTROLLING OPERATING STATE OF AN APPLICATION

CROSS-REFERENCE TO RELATED APPLICATIONS

This application claims the benefit of priority from Indian Patent Application No. 202111008258, filed Feb. 26, 2021, which is herein incorporated by reference in its entirety.

TECHNICAL FIELD

This disclosure generally relates to management of applications, and, more particularly, to methods and apparatuses for implementing a Kubernetes-based light switch module that provides an interface for scheduling automatic turning on/off an application in a Kubernetes platform.

BACKGROUND

Kubernetes, also known as K8s, is an open-source system for automating deployment, scaling, and management of containerized applications. As applications grow to span multiple containers deployed across multiple servers, operating them becomes more complex. To manage this complexity, Kubernetes may provide an open source application programming interface (API) that controls how and where those containers will run. In addition, Kubernetes may orchestrate clusters of virtual machines and schedule containers to run on those virtual machines based on their available compute resources and the resource requirements of each container. Containers may be grouped into pods, the basic operational unit for Kubernetes, and those pods scale to a user's desired state. Being able to turn off applications when they are not being used may result in major cost savings. However, there is no built in functionality in the Kubernetes platform to schedule turning an application off and on.

SUMMARY

The present disclosure, through one or more of its various aspects, embodiments, and/or specific features or sub-components, provides, among other features, various systems, servers, devices, methods, media, programs, and platforms for implementing a Kubernetes-based light switch module that provides an interface for scheduling automatic turning on/off an application in a Kubernetes platform, thereby resulting in cost savings (e.g., reducing power consumption, freeing compute resources for other usages, etc.) by automatically turning the application off during a time period when it is not being used, but the disclosure is not limited thereto.

According to an aspect of the present disclosure, a method for automatically controlling operating state of one or more applications in a distributed operating system by utilizing one or more processors and one or more memories is disclosed. The method may include: creating a filesystem that contains a script configured for interacting with a distributed operating system application programming interface (API); integrating the filesystem with a scheduler module to be run on a predefined schedule; creating a container, in response to the predefined schedule, in the distributed operating system, the container having the script installed therein; calling the distributed operating system API to obtain a list of applications in the distributed operating system based on the script; automatically controlling the operating state of the corresponding one or more applications in the distributed operating system in response to the predefined schedule and the script; and destroying the container after controlling the operating state of the corresponding one or more applications.

According to another aspect of the present disclosure, wherein the distributed operating system may be Kubernetes and the script installed in the container may be configured for applying commands to every deployment, or stateful set in a namespace or to target a desired deployment or stateful set, but the disclosure is not limited thereto.

According to yet another aspect of the present disclosure, wherein the commands may include instructions for turning off all deployments and/or all stateful sets in the namespace, and the method may further include: obtaining, by utilizing the script, a list of all deployments and/or all stateful sets in the namespace via a Kubernetes API; automatically turning off each deployment and/or each stateful set by scaling corresponding replicas to zero (0) in response to the predefined schedule and the script; and destroying the container after turning off all deployments and/or all stateful sets.

According to a further aspect of the present disclosure, wherein the commands may include instructions for turning on all deployments and/or all stateful sets in the namespace, and the method may further include: obtaining, by utilizing the script, a list of all deployments and/or all stateful sets in the namespace via a Kubernetes API; automatically turning on each deployment and/or each stateful set by scaling corresponding one or more replicas to one (1) or more in response to the predefined schedule and the script; and destroying the container after turning on all deployments and/or all stateful sets.

According to an additional aspect of the present disclosure, wherein the commands may include instructions for turning off a desired deployment and/or a desired stateful set in the namespace, and the method may further include: obtaining, by utilizing the script, the desired deployment and/or the desired stateful set in the namespace via a Kubernetes API; automatically turning off the desired deployment and/or the desired stateful set by scaling corresponding replicas to zero (0) in response to the predefined schedule and the script; and destroying the container after turning off the desired deployment and/or the desired stateful set.

According to yet another aspect of the present disclosure, wherein the commands may include instructions for turning on a desired deployment and/or a desired stateful set in the namespace, and the method may further include: obtaining, by utilizing the script, the desired deployment and/or the desired stateful set in the namespace via a Kubernetes API; automatically turning on the desired deployment and/or the desired stateful set by scaling corresponding replicas to one (1) or more in response to the predefined schedule and the script; and destroying the container after turning on the desired deployment and/or the desired stateful set.

According to a further aspect of the present disclosure, wherein the filesystem may be a Docker image that contains source code, libraries, dependencies, tools, and other files needed for one or more applications to run in the Kubernetes, but the disclosure is not limited thereto.

According to another aspect of the present disclosure, wherein the scheduler module may be a Kubernetes CronJob, but the disclosure is not limited thereto.

According to yet another aspect of the present disclosure, a system for automatically controlling operating state of one or more applications in a distributed operating system is disclosed. The system may include a distributed operating system; and a processor operatively coupled to the distributed operating system via a communication network. The processor may be configured to execute the following: create a filesystem that contains a script configured for interacting with a distributed operating system application programming interface (API); integrate the filesystem with a scheduler module to be run on a predefined schedule; create a container, in response to the predefined schedule, in the distributed operating system, the container having the script installed therein; call the distributed operating system API to obtain a list of applications in the distributed operating system based on the script; automatically control the operating state of the corresponding one or more applications in the distributed operating system in response to the predefined schedule and the script; and destroy the container after controlling the operating state of the corresponding one or more applications.

According to an additional aspect of the present disclosure, wherein the commands may include instructions for turning off all deployments and/or all stateful sets in the namespace, and the processor may be further configured to: obtain, by utilizing the script, a list of all deployments and/or all stateful sets in the namespace via a Kubernetes API; automatically turn off each deployment and/or each stateful set by scaling corresponding replicas to zero (0) in response to the predefined schedule and the script; and destroy the container after turning off all deployments and/or all stateful sets.

According to a further aspect of the present disclosure, wherein the commands may include instructions for turning on all deployments and/or all stateful sets in the namespace, and the processor may be further configured to: obtain, by utilizing the script, a list of all deployments and/or all stateful sets in the namespace via a Kubernetes API; automatically turn on each deployment and/or each stateful set by scaling corresponding replicas to one (1) or more in response to the predefined schedule and the script; and destroy the container after turning on all deployments and/or all stateful sets.

According to yet another aspect of the present disclosure, wherein the commands may include instructions for turning off a desired deployment and/or a desired stateful set in the namespace, and the processor may be further configured to: obtain, by utilizing the script, the desired deployment and/or the desired stateful set in the namespace via a Kubernetes API; automatically turn off the desired deployment and/or the desired stateful set by scaling corresponding replicas to zero (0) in response to the predefined schedule and the script; and destroy the container after turning off the desired deployment and/or the desired stateful set.

According to an aspect of the present disclosure, wherein the commands may include instructions for turning on a desired deployment and/or a desired stateful set in the namespace, the processor may be further configured to: obtain, by utilizing the script, the desired deployment and/or the desired stateful set in the namespace via a Kubernetes API; automatically turn on the desired deployment and/or the desired stateful set by scaling corresponding replicas to one (1) or more in response to the predefined schedule and the script; and destroy the container after turning on the desired deployment and/or the desired stateful set.

According to yet another aspect of the present disclosure, a non-transitory computer readable medium configured to store instructions for automatically controlling operating state of one or more applications in a distributed operating system is disclosed. The instructions, when executed, may cause a processor to perform the following: creating a filesystem that contains a script configured for interacting with a distributed operating system application programming interface (API); integrating the filesystem with a scheduler module to be run on a predefined schedule; creating a container, in response to the predefined schedule, in the distributed operating system, the container having the script installed therein; calling the distributed operating system API to obtain a list of applications in the distributed operating system based on the script; automatically controlling the operating state of the corresponding one or more applications in the distributed operating system in response to the predefined schedule and the script; and destroying the container after controlling the operating state of the corresponding one or more applications.

According to yet another aspect of the present disclosure, wherein the commands may include instructions for turning off all deployments and/or all stateful sets in the namespace, and wherein, when executed, the instructions further cause the processor to perform the following: obtaining, by utilizing the script, a list of all deployments and/or all stateful sets in the namespace via a Kubernetes API; automatically turning off each deployment and/or each stateful set by scaling corresponding replicas to zero (0) in response to the predefined schedule and the script; and destroying the container after turning off all deployments and/or all stateful sets.

According to a further aspect of the present disclosure, wherein the commands may include instructions for turning on all deployments and/or all stateful sets in the namespace, and wherein, when executed, the instructions further cause the processor to perform the following: obtaining, by utilizing the script, a list of all deployments and/or all stateful sets in the namespace via a Kubernetes API; automatically turning on each deployment and/or each stateful set by scaling corresponding replicas to one (1) or more in response to the predefined schedule and the script; and destroying the container after turning on all deployments and/or all stateful sets.

According to an additional aspect of the present disclosure, wherein the commands may include instructions for turning off a desired deployment and/or a desired stateful set in the namespace, and wherein, when executed, the instructions further cause the processor to perform the following: obtaining, by utilizing the script, the desired deployment and/or the desired stateful set in the namespace via a Kubernetes API; automatically turning off the desired deployment and/or the desired stateful set by scaling corresponding replicas to zero (0) in response to the predefined schedule and the script; and destroying the container after turning off the desired deployment and/or the desired stateful set.

According to yet another aspect of the present disclosure, wherein the commands may include instructions for turning on a desired deployment and/or a desired stateful set in the namespace, and wherein, when executed, the instructions further cause the processor to perform the following: obtaining, by utilizing the script, the desired deployment and/or the desired stateful set in the namespace via a Kubernetes API; automatically turning on the desired deployment and/or the desired stateful set by scaling corresponding replicas to one (1) or more in response to the predefined schedule and the script; and destroying the container after turning on the desired deployment and/or the desired stateful set.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 5 illustrates an exemplary role with access to scale deployments or stateful sets in accordance with an exemplary embodiment.

FIG. 6 illustrates an exemplary task in accordance with an exemplary embodiment.

DETAILED DESCRIPTION

Figure 1:
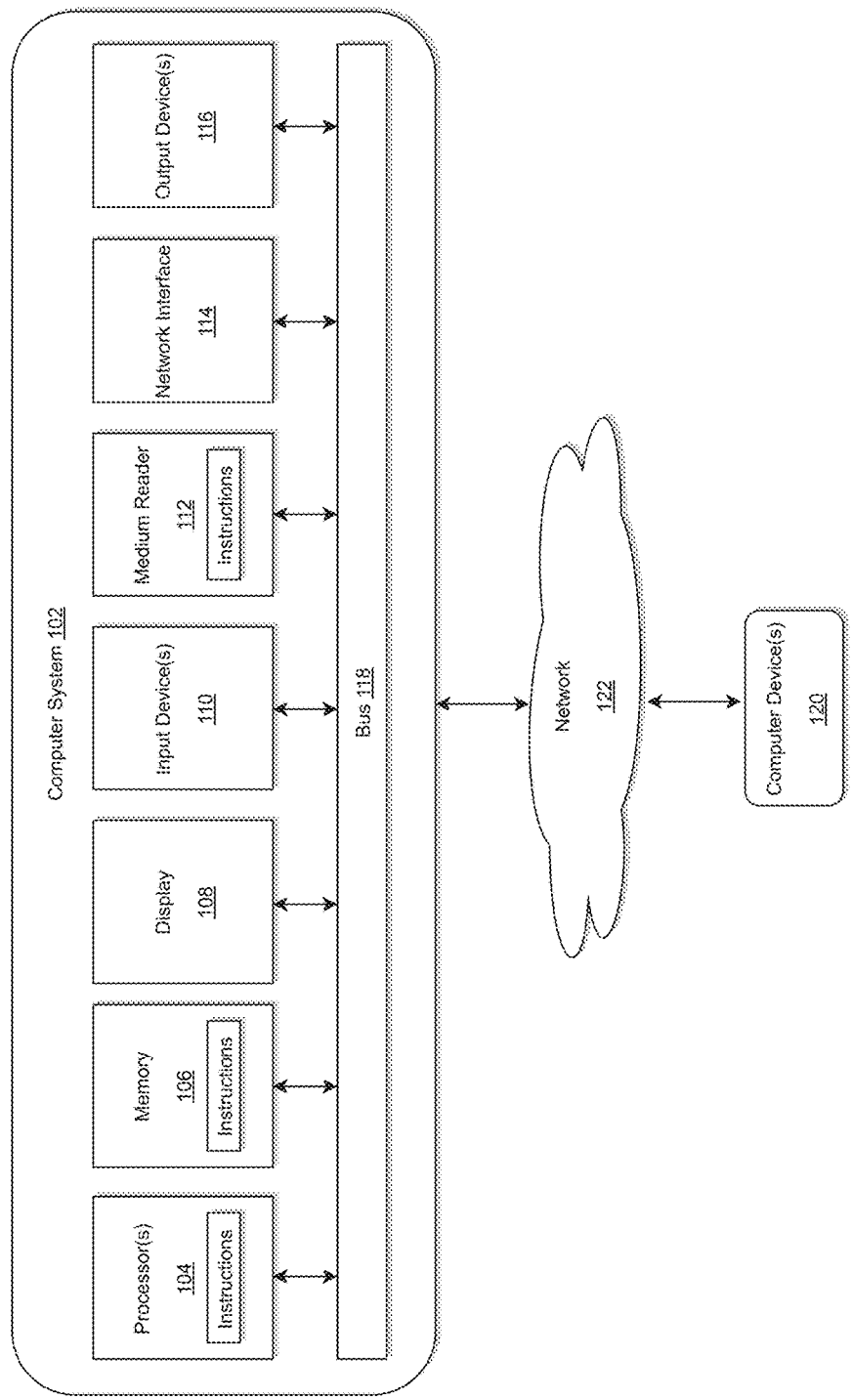
FIG. 1 illustrates a computer system for implementing a Kubernetes-based light switch module that provides an interface for scheduling automatic turning on/off an application in a Kubernetes platform in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in implementing a Kubernetes-based light switch module that provides an interface for scheduling automatic turning on/off an application in a Kubernetes platform in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecured and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (OPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

As described herein, various embodiments provide optimized processes of implementing a Kubernetes-based light switch module that provides an interface for scheduling automatic turning on/off an application in a Kubernetes platform, thereby resulting in cost savings (e.g., reducing power consumption, freeing compute resources for other usages, etc.) by automatically turning the application off during a time period when it is not being used, but the disclosure is not limited thereto.

Figure 2:
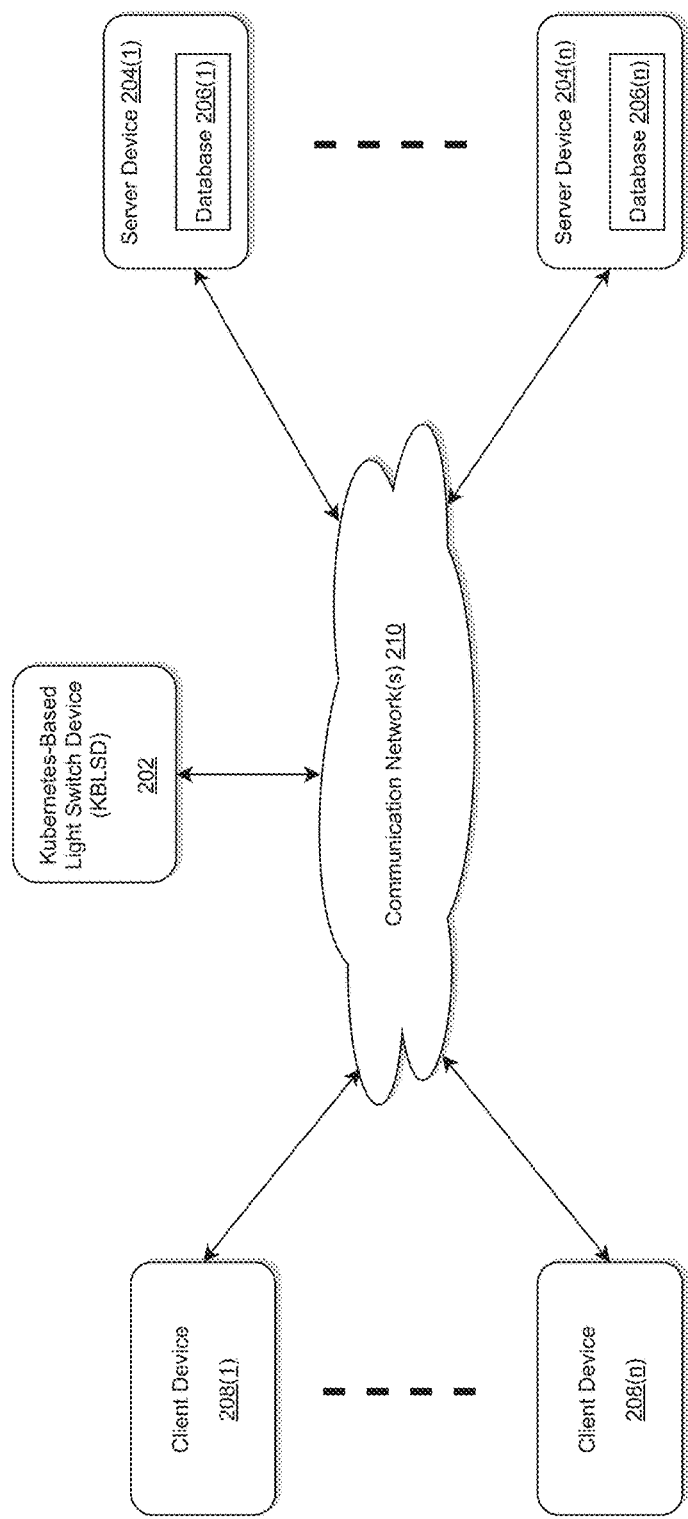
FIG. 2 illustrates an exemplary diagram of a network environment with a Kubernetes-based light switch device in accordance with an exemplary embodiment.

Referring to FIG. 2, a schematic of an exemplary network environment 200 for implementing a Kubernetes-based light switch device (KBLSD) of the instant disclosure is illustrated.

According to exemplary embodiments, the above-described problems associated with conventional methods and systems may be overcome by implementing an KBLSD 202 as illustrated in FIG. 2 by implementing a Kubernetes-based light switch module that provides an interface for scheduling automatic turning on/off an application in a Kubernetes platform, thereby resulting in cost savings (e.g., reducing power consumption, freeing compute resources for other usages, etc.) by automatically turning the application off during a time period when it is not being used, but the disclosure is not limited thereto.

The KBLSD 202 may be the same or similar to the computer system 102 as described with respect to FIG. 1.

The KBLSD 202 may store one or more applications that can include executable instructions that, when executed by the KBLSD 202, cause the KBLSD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the KBLSD 202 itself, may be located in virtual server(s) running in a cloud-based computing environment rather than being tied to one or more specific physical network computing devices. Also, the application(s) may be running in one or more virtual machines (VMs) executing on the KBLSD 202. Additionally, in one or more embodiments of this technology, virtual machine(s) running on the KBLSD 202 may be managed or supervised by a hypervisor.

In the network environment 200 of FIG. 2, the KBLSD 202 is coupled to a plurality of server devices 204(1)-204(n) that hosts a plurality of databases 206(1)-206(n), and also to a plurality of client devices 208(1)-208(n) via communication network(s) 210. A communication interface of the KBLSD 202, such as the network interface 114 of the computer system 102 of FIG. 1, operatively couples and communicates between the KBLSD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the KBLSD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like). Public Switched Telephone Network (PSTNs). Ethernet-based Packet Data Networks (PDNs), combinations thereof, and the like.

The KBLSD 202 may be a standalone device or integrated with one or more other devices or apparatuses, such as one or more of the server devices 204(1)-204(n), for example. In one particular example, the KBLSD 202 may be hosted by one of the server devices 204(1)-204(n), and other arrangements are also possible. Moreover, one or more of the devices of the KBLSD 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the KBLSD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(j)-208(n).

According to exemplary embodiments, the client devices 208(1)-208(n) in this example may include any type of computing device that can facilitate the implementation of the KBLSD 202 that may be configured for implementing a Kubernetes-based light switch module that provides an interface for scheduling automatic turning on/off an application in a Kubernetes platform, thereby resulting in cost savings (e.g., reducing power consumption, freeing compute resources for other usages, etc.) by automatically turning the application off during a time period when it is not being used, but the disclosure is not limited thereto.

Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, of other document collaborative software for example.

The client devices 208(1)-208(n) may run interface applications, such as standard web browsers or standalone client applications, which may provide an interface to communicate with the KBLSD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the KBLSD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the KBLSD 202, the server devices 204(1)-204(n), or the client devices 208(1)-208(n), for example, may be configured to operate as virtual instances on the same physical machine. For example, one or more of the KBLSD 202, the server devices 204(1)-204(n), or the client devices 208(1)-208(n) may operate on the same physical device rather than as separate devices communicating through communication network(s) 210. Additionally, there may be more or fewer KBLSDs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
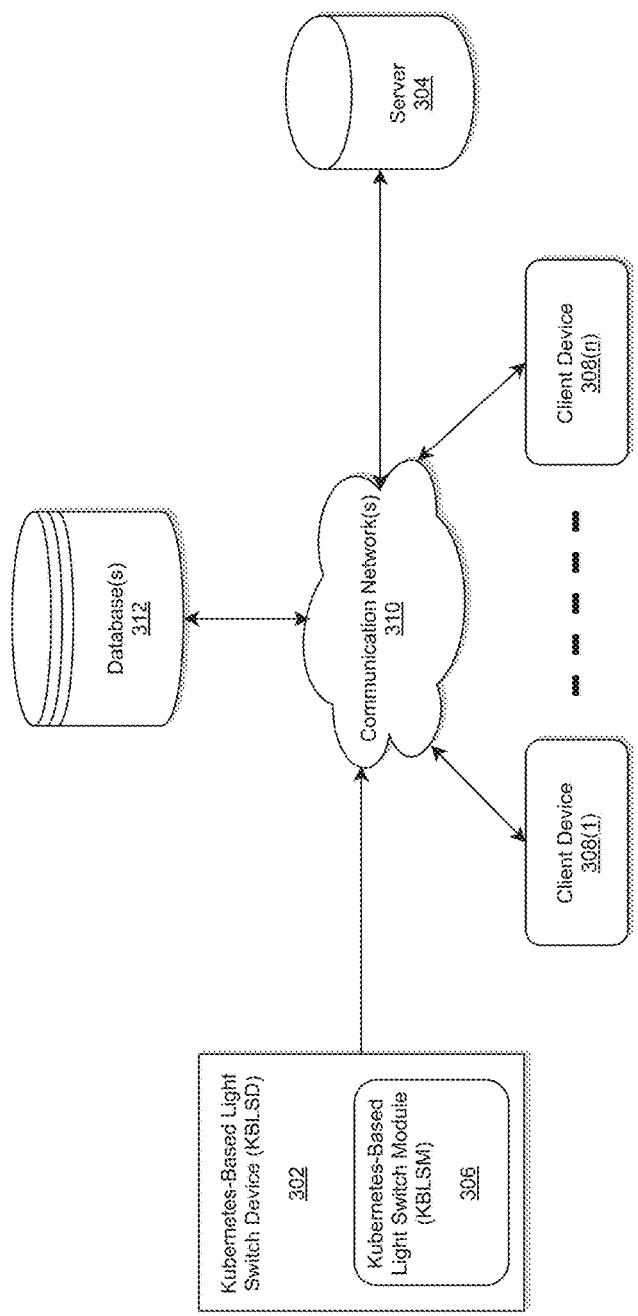
FIG. 3 illustrates a system diagram for implementing a Kubernetes-based light switch device with a Kubernetes-based light switch module in accordance with an exemplary embodiment.

FIG. 3 illustrates a system diagram 300 for implementing a KBLSD with a Kubernetes-based light switch module (KBLSM) in accordance with an exemplary embodiment.

As illustrated in FIG. 3, the KBLSD 302 including the KBLSM 306 may be connected to a server 304, and a database 312 via a communication network 310. The KBLSD 302 may also be connected to a plurality of client devices 308(1)-308(n) via the communication network 310, but the disclosure is not limited thereto. According to exemplary embodiments, the KBLSM 306 may be implemented within the client devices 308(1)-308(n), but the disclosure is not limited thereto. According to exemplary embodiments, the client devices 308(1)-308(n) may be utilized for software application development and machine learning model generations, but the disclosure is not limited thereto.

According to exemplary embodiment, the KBLSD 302 is described and shown in FIG. 3 as including the KBLSM 306, although it may include other rules, policies, modules, databases, or applications, for example. According to exemplary embodiments, the database 312 may be embedded within the KBLSD 302. Although only one database 312 is illustrated in FIG. 3, according to exemplary embodiments, a plurality of databases 312 may be provided. The database 312 may include one or more memories configured to store login information, data files, data content, API specification definition file (e.g., in JSON format), user profile data, data corresponding to trade details of a particular trade, etc., but the disclosure is not limited thereto. For example, the database 312 may include one or more memories configured to store information including: rules, programs, script, authentication information, log data, etc., but the disclosure is not limited thereto. According to exemplary embodiments, the KBLSM 306 may be configured to be storage platform agnostic—configured to be deployed across multiple storage layers.

According to exemplary embodiments, the KBLSM 306 may be configured to receive continuous feed of data from the database 312 and the server 304 via the communication network 310. According to exemplary embodiments, the database 312 may also be a private cloud-based database that supports user authentication, database security, and integration with existing databases and developments as well as stores open API specification definition file (i.e., in JSON format) corresponding to an application, but the disclosure is not limited thereto.

As will be described below, the KBLSM 306 may create a filesystem that contains a script configured for interacting with a distributed operating system application programming interface (API); integrate the filesystem with a scheduler module to be run on a predefined schedule; create a container, in response to the predefined schedule, in the distributed operating system, the container having the script installed therein; call the distributed operating system API to obtain a list of applications in the distributed operating system based on the script; automatically control the operating state of the corresponding one or more applications in the distributed operating system in response to the predefined schedule and the script; and destroy the container after controlling the operating state of the corresponding one or more applications, but the disclosure is not limited thereto.

The plurality of client devices 308(1)-308(n) are illustrated as being in communication with the KBLSD 302. In this regard, the plurality of client devices 308(1)-308(n) may be "clients" of the KBLSD 302 and are described herein as such. Nevertheless, it is to be known and understood that the plurality of client devices 308(1)-308(n) need not necessarily be "clients" of the KBLSD 302, or any entity described in association therewith herein. Any additional or alternative relationship may exist between either or more of the plurality of client devices 308(1)-308(n) and the KBLSD 302, or no relationship may exist.

One of the plurality of client devices 308(1)-308(n) may be, for example, a smart phone or a personal computer. Of course, the plurality of client devices 308(1)-308(n) may be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, either one or more of the plurality of client devices 308(1)-308(n) may communicate with the KBLSD 302 via broadband or cellular communication. Of course, these embodiments are merely exemplary and are not limiting or exhaustive.

Figure 4:
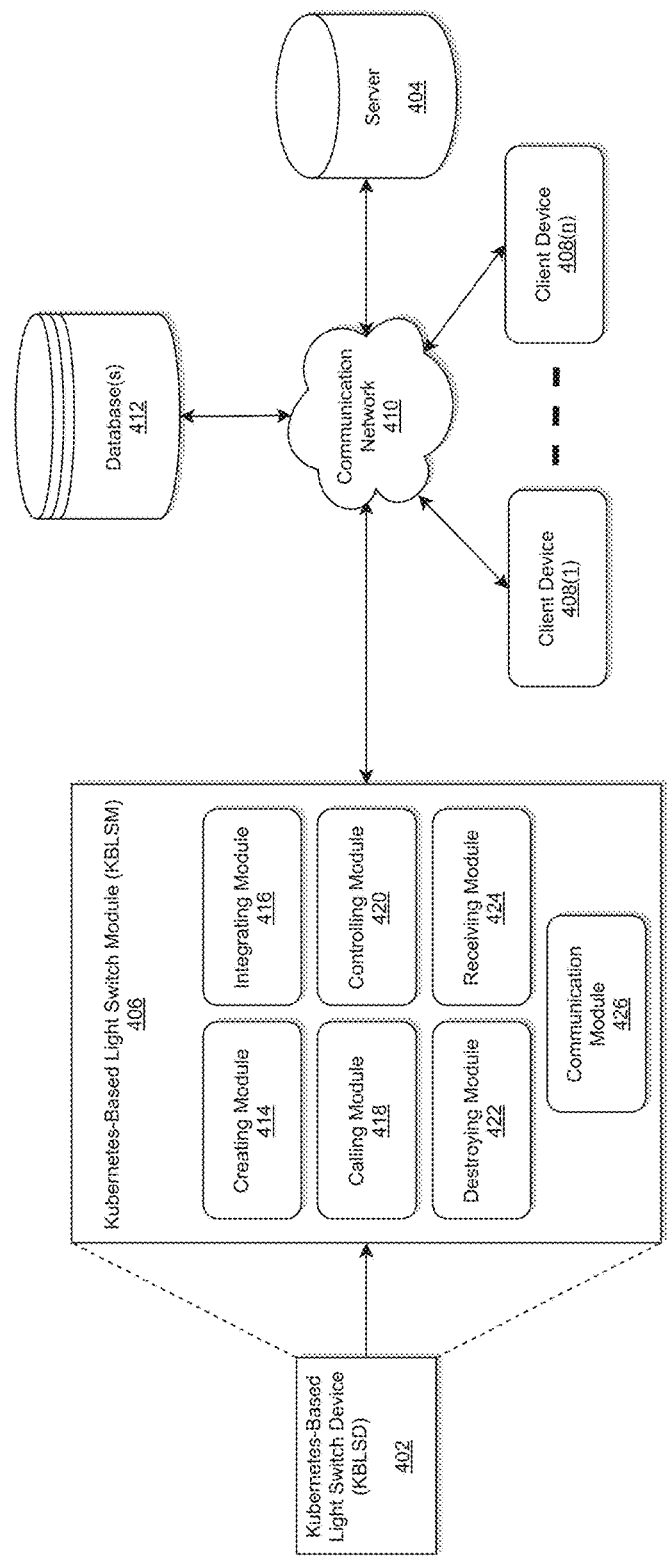
FIG. 4 illustrates a system diagram for implementing a Kubernetes-based light switch module of FIG. 3 in accordance with an exemplary embodiment.

FIG. 4 illustrates a system diagram for implementing a Kubernetes-based light switch module (KBLSM) of FIG. 3 in accordance with an exemplary embodiment.

As illustrated in FIG. 4, the system 400 may include a Kubernetes-based light switch device (KBLSD) 402 within which an KBLSM 406 may be embedded, a database 412, a server 404, client devices 408(1)-408(n), and a communication network 410. According to exemplary embodiments, the KBLSD 402, KBLSM 406, database 412, the server 404, the client devices 408(1)-408(n), and the communication network 410 as illustrated in FIG. 4 may be the same or similar to the KBLSD 302, the KBLSM 306, the database 312, the server 304, the client devices 308(1)-308(n), and the communication network 310, respectively, as illustrated in FIG. 3.

As illustrated in FIG. 4, the KBLSM 406 may include a creating module 414, an integrating module 416, a calling module 418, a controlling module 420, a destroying module 422, a receiving module 424, and a communication module 426. According to exemplary embodiments, the database 412 may be external to the KBLSD 402 may include various systems that are managed and operated by an organization. Alternatively, according to exemplary embodiments, the database 412 may be embedded within the KBLSD 402 and/or within the KBLSM 406.

According to exemplary embodiments, the KBLSM 406 may be implemented via user interfaces, e.g., web user interface, but the disclosure is not limited thereto, and may be integrated with a private cloud platform and a distributed operating system platform via the KBLSM 406 and an authentication service, but the disclosure is not limited thereto.

The process may be executed via the communication module 426 and the communication network 410, which may comprise plural networks as described above. For example, in an exemplary embodiment, the various components of the KBLSM 406 may communicate with the server 404, and the database 412 via the communication module 426 and the communication network 410. Of course, these embodiments are merely exemplary and are not limiting or exhaustive.

According to exemplary embodiments, the communication network 410 and the communication module 426 may be configured to establish a link between the database 412, the client devices 408(1)-408(n) and the KBLSM 406.

According to exemplary embodiments, each of the creating module 414, integrating module 416, calling module 418, controlling module 420, destroying module 422, receiving module 424, and the communication module 426 may be implemented by microprocessors or similar, they may be programmed using software (e.g., microcode) to perform various functions discussed herein and may optionally be driven by firmware and/or software. Alternatively, each of the creating module 414, integrating module 416, calling module 418, controlling module 420, destroying module 422, receiving module 424, and the communication module 426 may be implemented by dedicated hardware, or as a combination of dedicated hardware to perform some functions and a processor (e.g., one or more programmed microprocessors and associated circuitry) to perform other functions. Also, according to exemplary embodiments, each of the creating module 414, integrating module 416, calling module 418, controlling module 420, destroying module 422, receiving module 424, and the communication module 426 may be physically separated into two or more interacting and discrete blocks, units, devices, and/or modules without departing from the scope of the inventive concepts.

According to exemplary embodiments, each of the creating module 414, integrating module 416, calling module 418, controlling module 420, destroying module 422, receiving module 424, and the communication module 426 of the KBLSM 406 may be called by corresponding API, but the disclosure is not limited thereto.

According to exemplary embodiments, KBLSM 406 may be a Docker image that has tools installed that can be used to turn applications (i.e., Kubernetes applications, but the disclosure is not limited thereto) on and off. This can be paired with a scheduler module (i.e., a Kubernetes CronJob, but the disclosure is not limited thereto) to create periodic and recurring tasks to be ran on a schedule to allow for full automation of scheduled down and up times for the applications.

For example, according to exemplary embodiments, the creating module 414 may be configured to create a filesystem that contains a script configured for interacting with a distributed operating system application programming interface (API). According to exemplary embodiments, the API is called for querying and manipulating the state of objects in the distributed operating system. The core of the distributed operating system's control plane may be the API server and the HTTP API that it exposes. According to exemplary embodiments, the API may be a Kubernetes API that may be called for querying and manipulating the state of API objects in Kubernetes (for example: Pods, Namespaces, ConfigMaps, and Events). According to exemplary embodiments, most operations can be performed through a kubectl command-line interface which in turn use the Kubernetes API, but the disclosure is not limited thereto. For example, the distributed operating system API may be directly accessed using REST calls.

According to exemplary embodiments, the script may be a light switch script that may be installed on a Kubernetes light switch image. This script may be responsible for interacting with the Kubernetes API to turn applications on and off. The script has options for applying commands to every deployment or stateful set in a namespace as well as the option to target specific ones. A deployment may provide declarative updates for pods and replicas sets. A stateful set may be the workload API object used to manage stateful applications. Kubernetes may support multiple virtual clusters backed by the same physical cluster. According to exemplary embodiments, these virtual clusters may be called namespaces. In addition, a service account may provide an identity for processes that run in a pod.

According to exemplary embodiments, the following may describe full usage for the script (i.e., light switch script) and options, but the disclosure is not limited thereto.
Usage: lightswitch -k [deployment|statefulset]-d [deploymentName|statefulsetName|default] [-e excluded-deployments] [-r replicas]-a <stop|start> [-n namespace]
Options:
- -k kind of deployment type either 'deployment' or 'statefulset', default value is 'deployment'".
- -d the name of the deployment to apply the action to. Use 'default' to apply to all deployments.
- -a the action to perform on the deployment. Either stop or start.
- -e comma separated list of deployments to exclude when using the default option.
- -n the namespace to perform the action on. If running in a pod the default will be the namespace the pod is running in.
- -r the number of replicas to use when starting the deployment. Default is 1.
- -h display this help and exit.

A Docker image may be an immutable (unchangeable) file that contains the source code, libraries, dependencies, tools, and other files needed for an application to run. However, according to exemplary embodiments, the Kubernetes light switch image may be a Docker image that has the light switch script described above installed. The image also has kubectl installed on it for interacting with Kubernetes. The image allows for interacting with the light switch script from within Kubernetes. Thus, according to exemplary embodiments, the Kubernetes light switch image may include: /opt/kube/kubectl and/bin/lightswitch. Accordingly, when this image gets started at the Kubernetes, the pod that actually issues the command uses this image to create a container that has this image on it and the script will run on that and will delegate the call to kubectl binary which issues the commands via the Kubernetes API to do the start and stop. The container may be a running image. Once the container is being created, it adds a writable layer on top of the immutable image, thereby allowing modification. Thus, according to exemplary embodiments, the image may be a reusable component. A team that wishes to enable a light switch schedule on their deployments as disclosed herein can reuse this particular component without having to build it up themselves, and by applying a minor configuration in Kubernetes, the team can have supply of this reusable component to their various Kubernetes processes.

Interacting with the Kubernetes API may require authentication. Thus, according to exemplary embodiments, the KBLSM 406 may utilize the Kubernetes service account. According to exemplary embodiments, it may be required that the default service account for the image has a role with access to scale deployments or stateful sets. FIG. 5 illustrates an exemplary role 500 with access to scale deployments or stateful sets in accordance with an exemplary embodiment, but the disclosure is not limited thereto.

According to exemplary embodiments, the KBLSM 406 may be deployed as a CronJob so that the tasks of turning on and off the deployments and stateful sets can be automated on a schedule. FIG. 6 illustrates an exemplary task 600 in accordance with an exemplary embodiment, but the disclosure is not limited thereto.

Referring back to FIG. 4, the integrating module 416 may be configured to integrate the filesystem with a scheduler module (i.e., Kubernetes CronJob, but the disclosure is not limited thereto) to be run on a predefined schedule. The creating module 414 may be configured to create a container, in response to the predefined schedule, in the distributed operating system, the container having the script installed therein. The calling module 418 may be configured to call the distributed operating system API to obtain a list of applications in the distributed operating system based on the script. The controlling module 420 may be configured to automatically control the operating state of the corresponding one or more applications in the distributed operating system in response to the predefined schedule and the script. The destroying module 422 may be configured to destroy the container after controlling the operating state of the corresponding one or more applications.

According to exemplary embodiments, the distributed operating system may be Kubernetes and the script installed in the container may be configured for applying commands to every deployment, or stateful set in a namespace or to target a desired deployment or stateful set, but the disclosure is not limited thereto.

According to exemplary embodiments, the commands may include instructions for turning off all deployments and/or all stateful sets in the namespace. The receiving module 424 may be configured to obtain, by utilizing the script, a list of all deployments and/or all stateful sets in the namespace via a Kubernetes API. The controlling module 420 may be configured to automatically turn off each deployment and/or each stateful set by scaling corresponding replicas to zero (0) in response to the predefined schedule and the script and the destroying module 422 may be configured to destroy the container after turning off all deployments and/or all stateful sets.

According to exemplary embodiments, the commands may include instructions for turning on all deployments and/or all stateful sets in the namespace. The receiving module 424 may be configured to obtain, by utilizing the script, a list of all deployments and/or all stateful sets in the namespace via a Kubernetes API. The controlling module 420 may be configured to automatically turn on each deployment and/or each stateful set by scaling corresponding replicas to one (1) or more in response to the predefined schedule and the script and the destroying module 422 may be configured to destroy the container after turning on all deployments and/or all stateful sets.

According to exemplary embodiments, the commands may include instructions for turning off a desired deployment and/or a desired stateful set in the namespace. The receiving module 424 may be configured to obtain, by utilizing the script, the desired deployment and/or the desired stateful set in the namespace via a Kubernetes API. The controlling module 420 may be configured to automatically turn off the desired deployment and/or the desired stateful set by scaling corresponding replicas to zero (0) in response to the predefined schedule and the script and the destroying module 422 may be configured to destroy the container after turning off the desired deployment and/or the desired stateful set.

According to exemplary embodiments, the commands may include instructions for turning on a desired deployment and/or a desired stateful set in the namespace. The receiving module 424 may be configured to obtain, by utilizing the script, the desired deployment and/or the desired stateful set in the namespace via a Kubernetes API. The controlling module 420 may be configured to automatically turn on the desired deployment and/or the desired stateful set by scaling corresponding replicas to one (1) or more in response to the predefined schedule and the script and the destroying module 422 may be configured to destroy the container after turning on the desired deployment and/or the desired stateful set.

Figure 7:
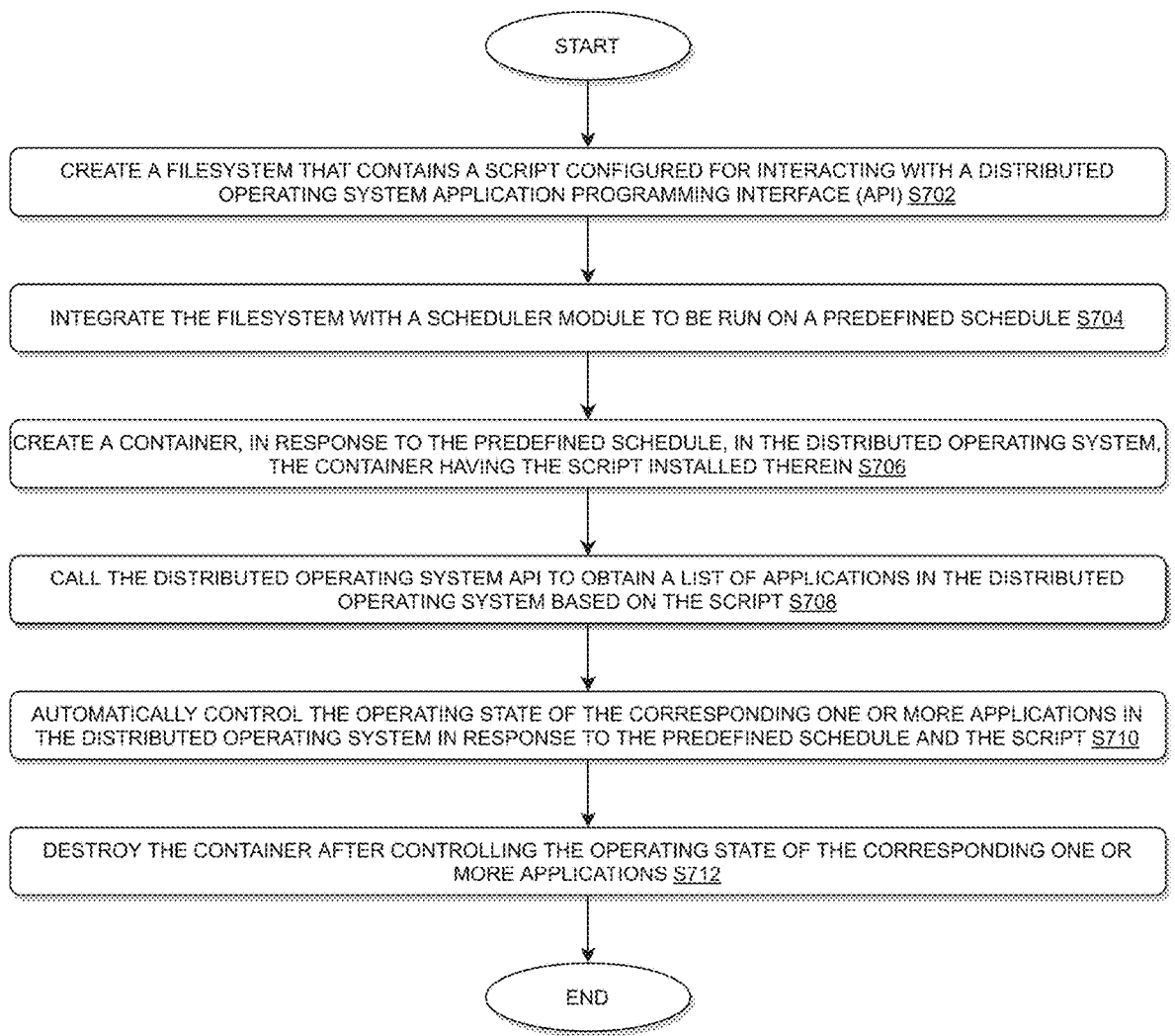
FIG. 7 illustrates a flow diagram for implementing a Kubernetes-based light switch module that provides an interface for scheduling automatic turning on/off an application in a Kubernetes platform in accordance with an exemplary embodiment.

FIG. 7 illustrates a flow diagram for implementing a Kubernetes-based light switch module that provides an interface for scheduling automatic turning on/off an application in a Kubernetes platform in accordance with an exemplary embodiment.

In the process 700 of FIG. 7, at step S702, a filesystem may be created that contains a script configured for interacting with a distributed operating system application programming interface (API).

At step S704, the process 700 may integrate the filesystem with a scheduler module to be run on a predefined schedule.

At step S706, the process 700 may create a container, in response to the predefined schedule, in the distributed operating system, the container having the script installed therein.

At step S708, the process 700 may call the distributed operating system API to obtain a list of applications in the distributed operating system based on the script.

At step S710, the process 700 may automatically control the operating state of the corresponding one or more applications in the distributed operating system in response to the predefined schedule and the script.

At step S712, the process 700 may destroy the container after controlling the operating state of the corresponding one or more applications.

According to exemplary embodiments, the commands may include instructions for turning off all deployments and/or all stateful sets in the namespace, and the process 700 may further include: obtaining, by utilizing the script, a list of all deployments and/or all stateful sets in the namespace via a Kubernetes API; automatically turning off each deployment and/or each stateful set by scaling corresponding replicas to zero (0) in response to the predefined schedule and the script; and destroying the container after turning off all deployments and/or all stateful sets.

According to exemplary embodiments, the commands may include instructions for turning on all deployments and/or all stateful sets in the namespace, and the process 700 may further include: obtaining, by utilizing the script, a list of all deployments and/or all stateful sets in the namespace via a Kubernetes API; automatically turning on each deployment and/or each stateful set by scaling corresponding replicas to one (1) or more in response to the predefined schedule and the script; and destroying the container after turning on all deployments and/or all stateful sets.

According to exemplary embodiments, the commands may include instructions for turning off a desired deployment and/or a desired stateful set in the namespace, and the process 700 may further include: obtaining, by utilizing the script, the desired deployment and/or the desired stateful set in the namespace via a Kubernetes API; automatically turning off the desired deployment and/or the desired stateful set by scaling corresponding replicas to zero (0) in response to the predefined schedule and the script; and destroying the container after turning off the desired deployment and/or the desired stateful set.

According to exemplary embodiments, the commands may include instructions for turning on a desired deployment and/or a desired stateful set in the namespace, and the process 700 may further include: obtaining, by utilizing the script, the desired deployment and/or the desired stateful set in the namespace via a Kubernetes API; automatically turning on the desired deployment and/or the desired stateful set by scaling corresponding replicas to one (1) or more in response to the predefined schedule and the script; and destroying the container after turning on the desired deployment and/or the desired stateful set.

According to exemplary embodiments, the KBLSD 402 may include a memory (e.g., a memory 106 as illustrated in FIG. 1) which may be a non-transitory computer readable medium that may be configured to store instructions for implementing the KBLSM 406 for automatically controlling operating state of one or more applications in a distributed operating system as disclosed herein. The KBLSD 402 may also include a medium reader (e.g., a medium reader 112 as illustrated in FIG. 1) which may be configured to read any one or more sets of instructions, e.g., software, from any of the memories described herein. The instructions, when executed by a processor embedded within the KBLSM 406 or within the KBLSD 402, may be used to perform one or more of the methods and processes as described herein. In a particular embodiment, the instructions may reside completely, or at least partially, within the memory 106, the medium reader 112, and/or the processor 104 (see FIG. 1) during execution by the KBLSD 402.

For example, the instructions, when executed, may cause the processor 104 to perform the following: creating a filesystem that contains a script configured for interacting with a distributed operating system application programming interface (API); integrating the filesystem with a scheduler module to be run on a predefined schedule; creating a container, in response to the predefined schedule, in the distributed operating system, the container having the script installed therein; calling the distributed operating system API to obtain a list of applications in the distributed operating system based on the script; automatically controlling the operating state of the corresponding one or more applications in the distributed operating system in response to the predefined schedule and the script; and destroying the container after controlling the operating state of the corresponding one or more applications, but the disclosure is not limited thereto.

According to exemplary embodiments, wherein the commands may include instructions for turning off all deployments and/or all stateful sets in the namespace, and wherein, when executed, the instructions further cause the processor 104 to perform the following: obtaining, by utilizing the script, a list of all deployments and/or all stateful sets in the namespace via a Kubernetes API; automatically turning off each deployment and/or each stateful set by scaling corresponding replicas to zero (0) in response to the predefined schedule and the script; and destroying the container after turning off all deployments and/or all stateful sets.

According to exemplary embodiments, wherein the commands may include instructions for turning on all deployments and/or all stateful sets in the namespace, and wherein, when executed, the instructions further cause the processor 104 to perform the following: obtaining, by utilizing the script, a list of all deployments and/or all stateful sets in the namespace via a Kubernetes API; automatically turning on each deployment and/or each stateful set by scaling corresponding replicas to one (1) or more in response to the predefined schedule and the script; and destroying the container after turning on all deployments and/or all stateful sets.

According to exemplary embodiments, wherein the commands may include instructions for turning off a desired deployment and/or a desired stateful set in the namespace, and wherein, when executed, the instructions further cause the processor 104 to perform the following: obtaining, by utilizing the script, the desired deployment and/or the desired stateful set in the namespace via a Kubernetes API; automatically turning off the desired deployment and/or the desired stateful set by scaling corresponding replicas to zero (0) in response to the predefined schedule and the script; and destroying the container after turning off the desired deployment and/or the desired stateful set.

According to exemplary embodiments, wherein the commands may include instructions for turning on a desired deployment and/or a desired stateful set in the namespace, and wherein, when executed, the instructions further cause the processor 104 to perform the following: obtaining, by utilizing the script, the desired deployment and/or the desired stateful set in the namespace via a Kubernetes API; automatically turning on the desired deployment and/or the desired stateful set by scaling corresponding replicas to one (1) or more in response to the predefined schedule and the script; and destroying the container after turning on the desired deployment and/or the desired stateful set.

According to exemplary embodiments as disclosed above in FIGS. 1-5, technical improvements effected by the instant disclosure may include platforms for implementing a Kubernetes-based light switch module that provides an interface for scheduling automatic turning on/off an application in a Kubernetes platform, thereby resulting in cost savings (e.g., reducing power consumption, freeing compute resources for other usages, etc.) by automatically turning the application off during a time period when it is not being used, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for automatically controlling operating state of one or more applications in a Kubernetes distributed operating system by utilizing one or more processors and one or more memories, the method comprising:
    creating a Docker image that contains a command line binary and a script configured for interacting with a Kubernetes application programming interface (API);
    integrating the Docker image with a scheduler module to create periodic and recurring tasks to be ran on a predefined schedule to allow for full automation of scheduled down and up times for the applications;
    wherein each run of one of the periodic and recurring tasks comprises, in response to the predefined schedule of the task:
        creating a container, using the Docker image, in the Kubernetes distributed operating system, the container having the script installed therein configured with a set of command options;
        automatically performing an action to control the operating state of one or more of the applications by utilizing the installed script configured to apply a command in accordance with the set of command options, the command options specifying at least: the action to perform, namespace to perform the action on, desired application name to apply the action or default option, and list of applications to exclude when using the default option,
        wherein the script runs on the container and delegates a call, based on the set of command options, to the command line binary which issues the commands via the Kubernetes API to perform the action; and
        destroying the container created for the task after controlling the operating state of the one or more applications,
    wherein the configurable values for the action to perform option include start and stop for turning one or more applications on or off respectively, and the default option is for applying the specified action to all applications in the specified namespace except for the applications specified in the list of applications to exclude, and
    wherein the periodic and recurring tasks include at least a first task and a second task, wherein the command options of the first task specify the stop action, a first namespace, the default option, and a first list of applications to exclude, the method further comprising, in response to the predefined schedule of the first task:
        obtaining, by utilizing the script, a list of all applications in the first namespace via the Kubernetes API;
        automatically turning off all the applications in the obtained list, except for the applications in the first list of applications to exclude, by scaling corresponding replicas to zero (0); and
        destroying the container created for the first task after turning off the applications, and
    wherein the command options of the second task specify the start action, a first desired application, and the first namespace, the method further comprising, in response to the predefined schedule of the second task:
        obtaining, by utilizing the script, the desired application in the namespace via the Kubernetes API;
        automatically turning on the desired application by scaling corresponding replicas to one (1) or more; and
        destroying the container created for the second task after turning on the desired application.

2. The method according to claim 1, wherein the command options further specify kind of application type, the value of which is selected from the group consisting of deployment and stateful set.

3. The method according to claim 1, wherein the number of corresponding replicas to use when turning on the desired application is specified in a further command option.

4. The method according to claim 1, wherein the Docker image contains source code, libraries, dependencies, tools, and other files needed for one or more applications to run in Kubernetes.

5. The method according to claim 1, wherein the scheduler module is a Kubernetes CronJob.

6. A system for automatically controlling operating state of one or more applications in a Kubernetes distributed operating system, the system comprising:
    the Kubernetes distributed operating system; and
    a processor operatively coupled to the Kubernetes distributed operating system via a communication network, wherein the processor is configured to execute instructions to perform the following:
        creating a Docker image that contains a command line binary and a script configured for interacting with a Kubernetes application programming interface (API);
        integrating the Docker image with a scheduler module to create periodic and recurring tasks to be ran on a predefined schedule to allow for full automation of scheduled down and up times for the applications;
        wherein each run of one of the periodic and recurring tasks comprises, in response to the predefined schedule of the task:
            creating a container, using the Docker image, in the Kubernetes distributed operating system, the container having the script installed therein configured with a set of command options;
            automatically performing an action to control the operating state of one or more of the applications by utilizing the installed script configured to apply a command in accordance with the set of command options, the command options specifying at least: the action to perform, namespace to perform the action on, desired application name to apply the action or default option, and list of applications to exclude when using the default option,
            wherein the script runs on the container and delegates a call, based on the set of command options, to the command line binary which issues the commands via the Kubernetes API to perform the action; and destroying the container created for the task after controlling the operating state of the one or more applications, wherein the configurable values for the action to perform option include start and stop for turning one or more applications on or off respectively, and the default option is for applying the specified action to all applications in the specified namespace except for the applications specified in the list of applications to exclude, and wherein the periodic and recurring tasks include at least a first task and a second task, wherein the command options of the first task specify the stop action, a first namespace, the default option, and a first list of applications to exclude, and the processor is further configured to perform, in response to the predefined schedule of the first task:

obtaining, by utilizing the script, a list of all applications in the first namespace via the Kubernetes API;

automatically turning off all the applications in the obtained list, except for the applications in the first list of applications to exclude, by scaling corresponding replicas to zero (0); and destroying the container created for the first task after turning off the applications, and wherein the command options of the second task specify the start action, a first desired application, and the first namespace, and the processor is further configured to perform, in response to the predefined schedule of the second task:

obtaining, by utilizing the script, the desired application in the namespace via the Kubernetes API;

automatically turning on the desired application by scaling corresponding replicas to one (1) or more; and destroying the container created for the second task after turning on the desired application.

7. The system according to claim 6, wherein the command options further specify kind of application type, the value of which is selected from the group consisting of deployment and stateful set.

8. The system according to claim 6, wherein the number of corresponding replicas to use when turning on the desired application is specified in a further command option.

9. The system according to claim 6, wherein the Docker image contains source code, libraries, dependencies, tools, and other files needed for one or more applications to run in Kubernetes.

10. The system according to claim 6, wherein the scheduler module is a Kubernetes CronJob.

11. A non-transitory computer readable medium configured to store instructions for automatically controlling operating state of one or more applications in a Kubernetes distributed operating system, wherein, when executed, the instructions cause a processor to perform the following:

creating a Docker image that contains a command line binary and a script configured for interacting with a Kubernetes application programming interface (API);

integrating the Docker image with a scheduler module to create periodic and recurring tasks to be ran on a predefined schedule to allow for full automation of scheduled down and up times for the applications;

wherein each run of one of the periodic and recurring tasks comprises, in response to the predefined schedule of the task:

creating a container, using the Docker image, in the Kubernetes distributed operating system, the container having the script installed therein configured with a set of command options;

automatically performing an action to control the operating state of one or more of the applications by utilizing the installed script configured to apply a command in accordance with the set of command options, the command options specifying at least: the action to perform, namespace to perform the action on, desired application name to apply the action or default option, and list of applications to exclude when using the default option, wherein the script runs on the container and delegates a call, based on the set of command options, to the command line binary which issues the commands via the Kubernetes API to perform the action; and destroying the container created for the task after controlling the operating state of the one or more applications, wherein the configurable values for the action to perform option include start and stop for turning one or more applications on or off respectively, and the default option is for applying the specified action to all applications in the specified namespace except for the applications specified in the list of applications to exclude, and wherein the periodic and recurring tasks include at least a first task and a second task, wherein the command options of the first task specify the stop action, a first namespace, the default option, and a first list of applications to exclude, the processor further being caused to perform, in response to the predefined schedule of the first task:

obtaining, by utilizing the script, a list of all applications in the first namespace via the Kubernetes API;

automatically turning off all the applications in the obtained list, except for the applications in the first list of applications to exclude, by scaling corresponding replicas to zero (0); and destroying the container created for the first task after turning off the applications, and wherein the command options of the second task specify the start action, a first desired application, and the first namespace, the processor further being caused to perform, in response to the predefined schedule of the second task:

obtaining, by utilizing the script, the desired application in the namespace via the Kubernetes API;

automatically turning on the desired application by scaling corresponding replicas to one (1) or more; and destroying the container created for the second task after turning on the desired application.

12. The non-transitory computer readable medium according to claim 11, wherein the command options further specify kind of application type, the value of which is selected from the group consisting of deployment and stateful set.

13. The non-transitory computer readable medium according to claim 11, wherein the number of corresponding replicas to use when turning on the desired application is specified in a further command option.

14. The non-transitory computer readable medium according to claim 11, wherein the Docker image contains source code, libraries, dependencies, tools, and other files needed for one or more applications to run in Kubernetes.

15. The non-transitory computer readable medium according to claim 11, wherein the scheduler module is a Kubernetes CronJob.

\* \* \* \* \*